Aug. 9, 1966  R. F. BUHL ETAL  3,264,801
CHROMATOGRAPHIC APPARATUS AND PROCESS

Filed Nov. 13, 1962  2 Sheets-Sheet 1

INVENTORS.
ROBERT F. BUHL
MARION L. YEAGLE
BY
Edward H. Long
ATTORNEY.

INVENTORS.
ROBERT F. BUHL
MARION L. YEAGLE
BY
ATTORNEY.

United States Patent Office 3,264,801
Patented August 9, 1966

3,264,801
CHROMATOGRAPHIC APPARATUS
AND PROCESS
Robert F. Buhl and Marion L. Yeagle, Crystal Lake, Ill., assignors, by mesne assignments, to Union Oil Company of California, Los Angeles, Calif., a corporation of California
Filed Nov. 13, 1962, Ser. No. 237,046
13 Claims. (Cl. 55—67)

This invention relates to fluid separation and, more particularly, to an improved chromatographic apparatus and method for separating fluid mixtures.

One method by which the seperation of a fluid mixture into components can be accomplished is by chromatography. In vapor phase chromatography, a fluid mixture to be separated and a carrier gas are introduced at different locations into an elongated body of particles of a sorptive material. The sorptive material contained in the elongated body, which is usually referred to as a chromatographic column, is either an adsorbent in granular form or an inert, granular material on which has been deposited a film or coating of a desired non-volatile liquid adsorbent. The components of the fluid mixture are swept through the column by the carrier gas at different rates of speed, which are dependent upon the respective affinities of the sorptive material for them. Under constant conditions, i.e., at a given temperature, flow rate, and pressure, and with the same carrier gas, column, column conditions, etc., the affinity of the sorptive material for each component of the fluid mixture will remain constant. Therefore, each component of the fluid mixture will be held by the sorptive material for a time which is characteristic to it alone, which time is referred to as the component's "retention time."

If the sorptive material is moved through the column in a direction countercurrent to the carrier gas flow and at a rate equal to the rate of passage of one component through the same sorptive material when stationary, that component will remain in one place with respect to the column itself. On the other hand, components with shorter retention times will travel in the direction of the carrier gas flow, while materials with longer retention times will travel in the column countercurrent to the carrier gas flow.

Chromatography has become a widely used analytical technique for removing a component of high purity from a fluid mixture. It is especially useful in the petroleum industry where the technique permits the rapid and accurate analysis of hydrocarbon mixtures, as for example, residue streams from various petroleum refining operations to determine the constituents thereof. Until recently, chromatographic techniques proposed for commercial separations have not been particularly suitable, since they have been batch processes or continuous processes effective for dividing a fluid mixture into only two fractions. Recently, several chromatographic apparatuses and methods for continuously separating components of a gaseous mixture have been proposed, and in U.S. Patent No. 3,016,107 there is disclosed a continuous chromatographic technique for separating a gaseous mixture into three components. However, the chromatographic technique disclosed in said patent suffers from the disadvantages that it is limited to the separation of a fluid mixture into three components, which necessitates that two or more components of a feed mixture comprised of more than three components be removed together as a single component, and that the third component be separated from the gas separation, or sorptive material outside of the column.

This invention is based upon the discovery of an improved chromatographic apparatus and method for separating on a continuous basis a multi-component fluid mixture comprising three or more components into three or more streams which have chemical compositions of reduced complexity. The chromatographic technique of this invention avoids the disadvantages inherent in many of the chromatographic techniques which have been heretofore proposed.

Accordingly, it is the primary object of this invention to provide an improved fluid separation apparatus and method.

Another object of this invention is to provide an improved chromatographic apparatus and method for separating fluid mixtures.

Still another object of this invention is to provide a chromatographic apparatus and method for separating fluid mixtures on a continuous basis.

A further object of this invention is to provide a chromatographic apparatus and method for separating on a continuous basis fluid mixtures comprised of three or more constituents into three or more streams which have chemical compositions of reduced complexity.

These and further objects of this invention will be described or become apparent as the description thereof proceeds and reference is made to the accompanying drawings in which.

Figure 1:
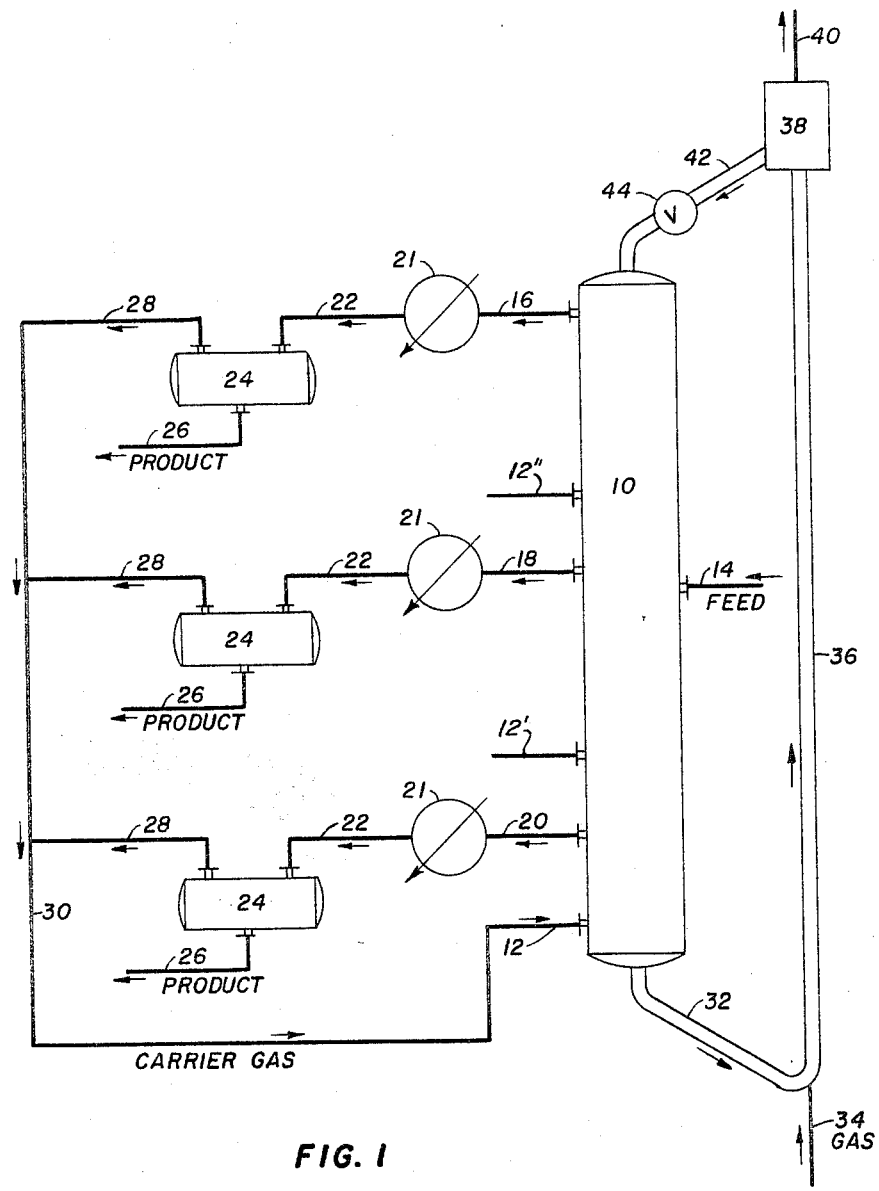
FIGURE 1 is a schematic diagram of one form of the apparatus of this invention.

In accordance with this invention, a multi-component fluid mixture comprising at least three components is continuously introduced into a chromatographic column through which a suitable sorptive material is continuously travelling. The column is preferably a vertically extending column, but the separating material may travel through the column in either a downwardly or upwardly direction. Preferably, the column includes auxiliary equipment to collect the sorptive material at the downstream end of the column and recycle the collected material to the location where the sorptive material is introduced into the column.

A carrier gas is continuously introduced into the moving body of sorptive material at a point downstream from where the fluid mixture is introduced. The utilization of a sorptive material which has a different affinity for each of the components of the fluid mixture will result in the components being swept through the column by the carrier gas at rates which are dependent upon the affinities of the separating material for them. Outlet streams, in a number corresponding to the number of fractions it is desired to separate from the fluid mixture, are withdrawn from the column at spaced locations along the course of the moving sorptive material and carrier gas. Each of the outlet streams comprises a portion of the carrier gas and a portion of the gaseous mixture consisting essentially of one of the components.

It can therefore be seen that our invention is directed to a continuous chromatographic system comprising continuously introducing a multi-component fluid mixture into a column through which a sorptive material and a carrier gas are countercurrently travelling and withdrawing from the column intermediate the points of introduction of the sorptive material and carrier gas at least three outlet streams. This system will continuously separate a fluid mixture comprising at least three components into at least three fractions which have chemical compositions of reduced complexity by properly selected sorptive material, carrier gas, column operating conditions, e.g., flow rates of feed mixture, carrier gas, and separating material, and rates of withdrawal of exit streams, and by outlets and feed gas inlet properly placed with respect to each other. It is within the capability of one skilled in the art to select the proper sorptive material, carrier gas, velocities, etc., for a given separation.

Various fluid separating materials can be utilized in the chromatographic apparatus and method of this invention. The sorptive material can be, for example, of the adsorbent type, such as charcoal, alumina, silica gel, or a molecular sieve material. In the case of gas-liquid partition chromatography a sorptive material comprising a thin coating of a liquid absorbent on a relatively inert carrier, such as metal spheres, ceramic beads or discs, and diatomaceous earth, may also be used. Liquids that are most suitable for partition chromatography include high-boiling organic solvents such as mineral oil, di-octyl phthlate, di-nonyl phthlate, silicone fluids, tricresyl phosphate, dibutyl phthlate, triethyl amine, nitrobenzene, dioctyl sebacate, and the like. It is also possible to use more volatile partitioning liquids such as water in partition chromatography if any such liquids have particularly desirable solvent properties. When using a volatile partitioning liquid, the carrier gas should be saturated with the partitioning liquids so that the liquid will not be removed from the solids by the carrier gas. It will be evident that in some instances one particular sorptive material may be superior to another for separating a particular fluid mixture.

The carrier gas should be chemically inert with respect to the components being separated and the sorptive material. Examples of suitable carrier gases include nitrogen, steam, air, helium, hydrogen, argon, methane, carbon dioxide, and the like. It will be evident that some of these gases will be reactive with components of certain fluid mixtures and therefore should be avoided for such separations.

The technique of the instant invention may be utilized to separate a wide variety of multi-component mixtures. Fluid mixtures, as well as gas mixtures, may be separated provided that conditions, i.e., elevated temperature and/or reduced pressure, under which vaporization of the components of the mixture will occur, are used. Illustrative of fluid mixtures which can be separated by the chromatographic technique of this invention are mixtures of hydrocarbons, alcohols, esters, ethers, ketones, halogenated hydrocarbons, and the like.

This invention is best described by reference to FIGURE 1, wherein the numeral 10 represents a vertical chromatographic column, which is arranged for gravity flow therethrough of a stream of a granular separating material. A suitable carrier gas is introduced into the bottom of column 10 through line 12 so that it travels in column 10 in a direction countercurrent to that of the downflowing sorptive material. A gaseous mixture of three components is introduced into column 10 through line 14, which is in a properly selected location between carrier gas inlet line 12 and the top of column 10 where the sorptive material is introduced. As the feed mixture contacts the moving bed of separating material, each component of the gaseous mixture will have its individual velocity through column 10 depending upon the affinity of the sorptive material for it. The velocity of the separating material in column 10 is controlled by suitable means to be intermediate the velocities of the components being separated. The component of the feed having the shortest retention time will have the highest velocity and hence will travel in the direction of carrier gas flow and will pass out of column 10 through outlet 16. The component having a velocity substantially the same as the velocity of the downflowing sorptive material will, for all practical purposes, remain in one place with respect to column 10, and will pass out of column 10 through conduit 18. The component having the lowest velocity (less than the downward velocity of the sorptive material) will be carried countercurrent to the carrier gas flow and will be withdrawn from column 10 through outlet 20. It will be evident that the component withdrawn through each of the outlets will include a portion of the carrier gas and small amounts of the other components.

Each of the effluents withdrawn from chromatographic column 10 through outlets 16, 18 and 20 is introduced into suitable means for separating the carrier gas therefrom. This means may include, for example, coolers 21 for condensing the product from the non-condensible carrier gas, with coolers 21 being connected by lines 22 to gas-liquid separators 24. Separators 24 are provided with lines 26 for withdrawing the product as a bottom liquid fraction and lines 28 for withdrawing the carrier gas as an overhead vapor fraction. Lines 28 communicate with conduit 30, which in turn communicates with carrier gas inlet line 12.

The apparatus of this invention also includes means for collecting the granular separating material at the lower end of column 10 and transferring the collected sorptive material to the upper end thereof. In the illustrated embodiment, this means comprises inclined conduit 32 in which the sorptive material is accumulated and picked up by lift gas introduced through conduit 34 and carried up conduit 36. The lift gas is removed from the sorptive material through hopper 38 and withdrawn through vent 40, after which the sorptive material flows down inclined conduit 42 and into column 10. Preferably, flow control valve 44 is included in conduit 42 to regulate the flow of solid back into and through column 10. Column 10 preferably contains means at the extremities thereof for passing the granular material while preventing pressure losses.

Figure 2:
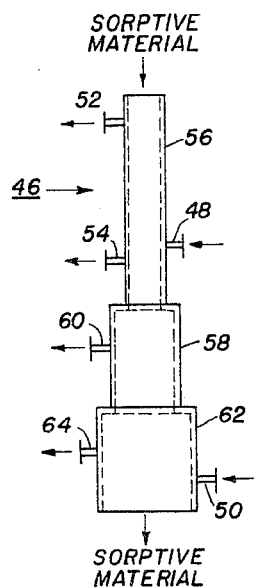
FIGURE 2 is a partial elevation of another form of the chromatographic column of this invention.

FIGURE 2 illustrates an alternative embodiment of the chromatographic column having progressively reducing cross-sectional areas which form contiguous sectional chambers, such that the internal cross-sectional area of the end where the sorptive material is introduced is only a fraction of the internal cross-sectional area of the end where the sorptive material is withdrawn, to change the linear ratio of flow of sorptive material and carrier gas from one sectional chamber to the other. Referring to FIGURE 2, a suitable sorptive material is introduced through the top of chromatographic column 46, which is arranged for gravity flow of the sorptive material therethrough. A gaseous mixture having four components is introduced through line 48 into the downflowing sorptive material in column 46, while a suitable carrier gas, introduced through line 50, flows up column 46. The two components of the feed having the highest velocities are withdrawn through lines 52 and 54, which are located in upper section 56 of column 46. As the sorptive material enters section 58 of column 46, which has a greater internal diameter than that of section 56, the vertical flow rate of the sorptive material is decreased and a third component of the feed mixture is withdrawn through outlet 60. On moving downward into section 62 of column 46, the flow rate of the sorptive material is again reduced and the component of the gaseous mixture having the lowest velocity is withdrawn through outlet 64.

While this invention has been described in relation to specific embodiments, modifications which may be made without departing from the intended scope of the invention will be apparent to those skilled in the art. For example, the described chromatographic technique may be utilized for separating a fluid mixture having more than 3 or 4 components by the provision of additional product outlets, along with associated separating means. The feed gas inlet line may be located at any desired point on the column, depending on the separation desired and other variables in the system. Means, such as bucket conveyor, screw conveyor, and the like, can be utilized in lieu of a gas lift for carrying the granular separating material to the top of the chromatographic column. While the invention has been described as comprising a chromatographic column arranged for gravity flow of the sorptive material therethrough, means, such as a screw conveyor, can be utilized for closely regulating the flow of the sorptive material within the column. In addition, the column may be arranged such that the sorptive material travels upward while the carrier gas travels downward.

The chromatographic column may be modified in various ways to facilitate separations. For example, greater flexibility is provided where there is provision for progressive change in temperature throughout the column in order to modify the retention time relationships. Differentially heating sections of the column, which may be achieved by resistance wire windings in a column constructed of a thermally-conductive material, or otherwise, enables better control of the separation. In addition, additional carrier gas may be introduced at various points intermediate the ends of the column, as for example, at lines 12' and 12" immediately above outlet lines 18 and 20 in FIGURE 1, to achieve optimum carrier gas flow throughout the column.

Figure 3:
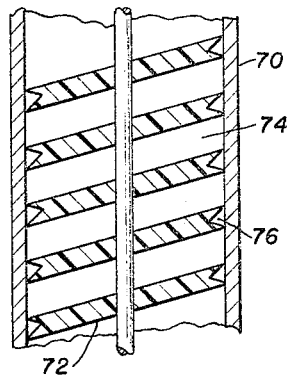
FIGURE 3 is a partial view, in cross-section, of a chromatographic column showing means for regulating the flow of sorptive material through the column.

A chromatographic column containing means for regulating the flow of sorptive material therethrough is illustrated in FIGURE 3. Referring to FIGURE 3, extending entirely through chromatographic column 70 is rotary helical feed screw 72, which preferably is made of a resilient material such as nylon, that engages the inner surface of column 70. Screw 72 is rotated so that sorptive material 74 is moved in a desired direction in column 70, that is, either downward or upward. A gas-tight seal may be achieved by providing screw 72 with groove 76 at the extremity thereof and providing in groove 76 a soft beading, or by means of feather edges on the extremity of screw 72.

Figure 4:
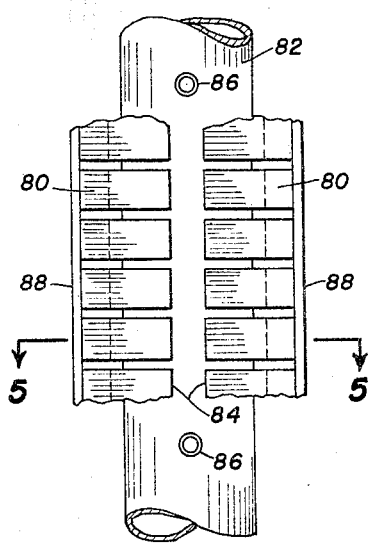
FIGURE 4 is a partial elevation of a chromatographic column showing another means for closely regulating the flow of sorptive material through the column.
Figure 5:
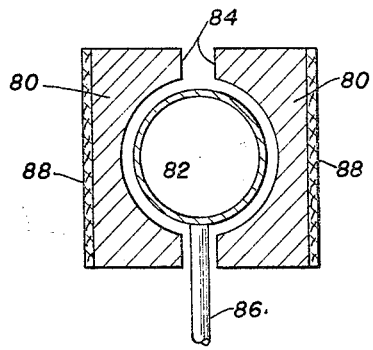
FIGURE 5 is a sectional view along line 5—5 of FIGURE 4.

An alternative embodiment of means for regulaitng the flow of sorptive material through a chromatographic column is illustrated in FIGURES 4 and 5. This embodiment, which is useful only for moving ferromagnetic separating material through a chromatographic column constructed of a non-ferromagnetic material and having a uniform outside diameter, comprises a stacked plurality of adjacent pairs of permanent magnets 80. A surface of the individual magnets 80 of each pair is shaped to conform to a portion of the outer surface of chromatographic column 82 so that each pair of magnets 80 substantially surrounds a vertical portion of column 82, but spaces 84 are provided between the adjacent surfaces of magnets 80 of each pair to permit their passage past inlet and outlet conduits 86. The corresponding surfaces of magnets 80 of each stack are secured to endless belts 88. Belts 88 move at identical speeds with respect to chromatographic column 82, and in the same direction. It will be evident that a ferromagnetic sorptive material, such as granules of sintered nickel coated with a suitable partitioning liquid, will move in column 82 at the same speed and in the same direction that magnets 80 move. The proper arrangement of magnets 80 according to polarities will be evident to one skilled in the art. Apparent modifications of this embodiment include the utilization of electromagnets and the utilization of more than one pair of magnets to surround a vertical portion of the chromatographic column.

The embodiments of the invention in which an exclusive property or privilege is claimed are defined as follows:

1. A method of continuously separating a fluid mixture containing at least three components, which comprises continuously introducing a sorptive material in a prescribed course of flow and moving said sorptive material along said prescribed course, continuously introducing a fluid mixture containing at least three components into said moving sorptive material, said sorptive material having different affinities for each of said components, continuously introducing a countercurrent stream of a carrier gas into said moving sorptive material at a point along said course downstream from the point of introduction of the fluid mixture, and withdrawing from said moving sorptive material at spaced points along said course and intermediate the points of introduction of said sorptive material and carrier gas, at least three product streams, each of said product streams comprising carrier gas and a portion of said fluid mixture consisting essentially of one of said components.

2. A method in accordance with claim 1 in which said sorptive material and carrier gas are introduced at opposite ends of an elongated column.

3. A method in accordance with claim 2 in which said column is a vertically extending column and said sorptive material is moved in a downwardly direction.

4. A method in accordance with claim 3 in which said sorptive material is collected at the lower end of said column and elevated to the top thereof.

5. A method in accordance with claim 1 which includes separating the carrier gas from each of said product streams.

6. A method in accordance with claim 1 in which said sorptive material is an absorbent in granular form.

7. A method in accordance with claim 1 in which said sorptive material is an inert granular material having a coating of a liquid absorbent.

8. A method in accordance with claim 1 in which said sorptive material is a ferromagnetic material and the movement thereof is controlled by moving magnets.

9. A method in accordance with claim 1 in which additional carrier gas is introduced into said moving sorptive material intermediate the points of introduction of said sorptive material and first-named carrier gas.

10. A method in accordance with claim 1 in which said sorptive material is differentially heated along said course.

11. In a method of continuously separating a fluid mixture into fractions by continuously moving through an elongated column a sorptive material having different affinities for each of said fractions, continuously introducing into said moving sorptive material a fluid mixture and a carrier gas, and withdrawing product streams from said moving sorptive material, the improvement which comprises moving a sorptive material of a ferromagnetic material through a column of a non-ferromagnetic material and controlling the movement of said sorptive material by moving magnets along the outer surface of said column.

12. In combination with an apparatus for the continuous separation of a fluid mixture which includes an elongated column of a non-ferromagnetic material; means for introducing a ferromagnetic granular material into one end of said column; means for withdrawing said granular material from the other end of said column; and a fluid feed inlet, a carrier gas inlet, and product outlets intermediate the ends of said column; movable magnets surrounding the outer surface of said column to regulate the movement of said granular material within said column.

13. An apparatus for the continuous separation of a fluid mixture containing at least three components, which comprises an elongated column adapted to permit the flow of carrier gas substantially throughout, means for introducing a sorptive material into one end of said column, means for withdrawing said sorptive material from the other end of said column, a fluid feed inlet intermediate the ends of said column, a carrier gas inlet intermediate said fluid feed inlet and means for withdrawing said sorptive material, and at least three spaced product outlets intermediate said carrier gas inlet and means for introducing said sorptive material, said column being of a non-ferromagnetic material and including movable magnets substantially surrounding the outer surface thereof to regulate the movement of ferromagnetic sorptive material in said column.

References Cited by the Examiner

UNITED STATES PATENTS

| | | | |
|---|---|---|---|
| 2,575,520 | 11/1951 | Berg | 55—79 X |
| 2,590,322 | 3/1952 | Imhoff et al. | 55—79 X |
| 2,813,786 | 11/1957 | Milliken | 55—79 X |
| 2,869,672 | 1/1959 | Findlay | 55—38 |
| 2,946,402 | 7/1960 | Becker-Boost et al. | 55—34 X |
| 3,023,835 | 3/1962 | Brashear | 55—386 X |
| 3,063,217 | 11/1962 | Armond et al. | 55—79 X |

REUBEN FRIEDMAN, *Primary Examiner.*

J. ADEE, *Assistant Examiner.*